United States Patent [19]

Slattery

[11] 4,274,190
[45] Jun. 23, 1981

[54] TRANSIT BUS MODERNIZATION METHOD
[75] Inventor: Michael J. Slattery, Roslindale, Mass.
[73] Assignee: Charles J. Monahan, Quincy, Mass.
[21] Appl. No.: 38,269
[22] Filed: May 11, 1979
[51] Int. Cl.³ .............................................. B23P 7/00
[52] U.S. Cl. .................................. 29/401.1; 296/178
[58] Field of Search ................ 29/426.1, 426.2, 426.3, 29/426.4, 426.5, 426.6, 401.1; 296/28

[56] References Cited
U.S. PATENT DOCUMENTS

| | | | |
|---|---|---|---|
| 2,555,556 | 6/1951 | Panzegrau et al. | 29/401.1 |
| 3,309,759 | 3/1967 | Vittone | 29/401.1 |

Primary Examiner—Charlie T. Moon
Assistant Examiner—V. K. Rising

[57] ABSTRACT

A method is disclosed whereby the exterior of an older bus can be refurbished and modernized to incorporate both the design features and certain advantageous mechanical functions inherent in modern bus exteriors. The method involves the stripping away of the old monocoque exterior sheathing of the bus, together with the windows, the emergency door, and the front and rear sheathing beneath the windshield housings, then building up a framework of skin support structure between the sheathing support beams, stretching a skin across the sheathing support beams and tack welding it into place against the new framework. New style windows are inserted into place and a new, modernized emergency door is installed.

7 Claims, 20 Drawing Figures

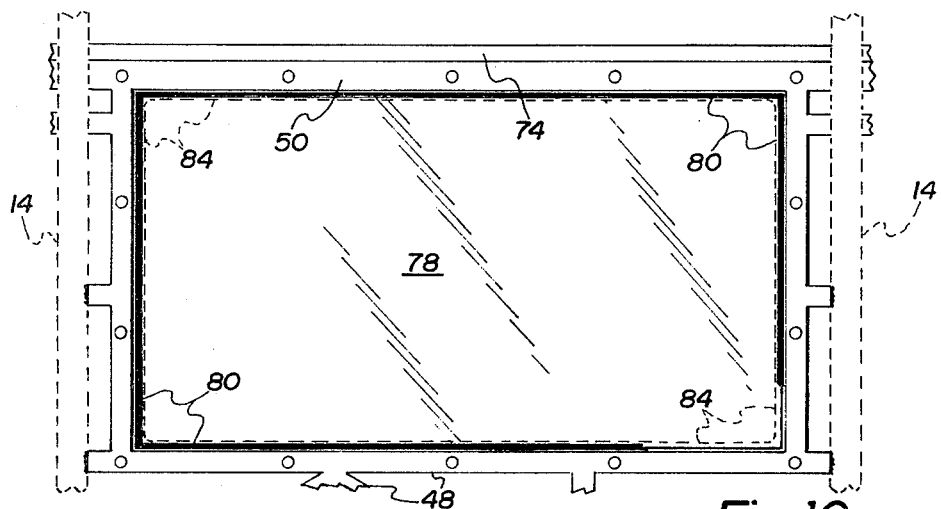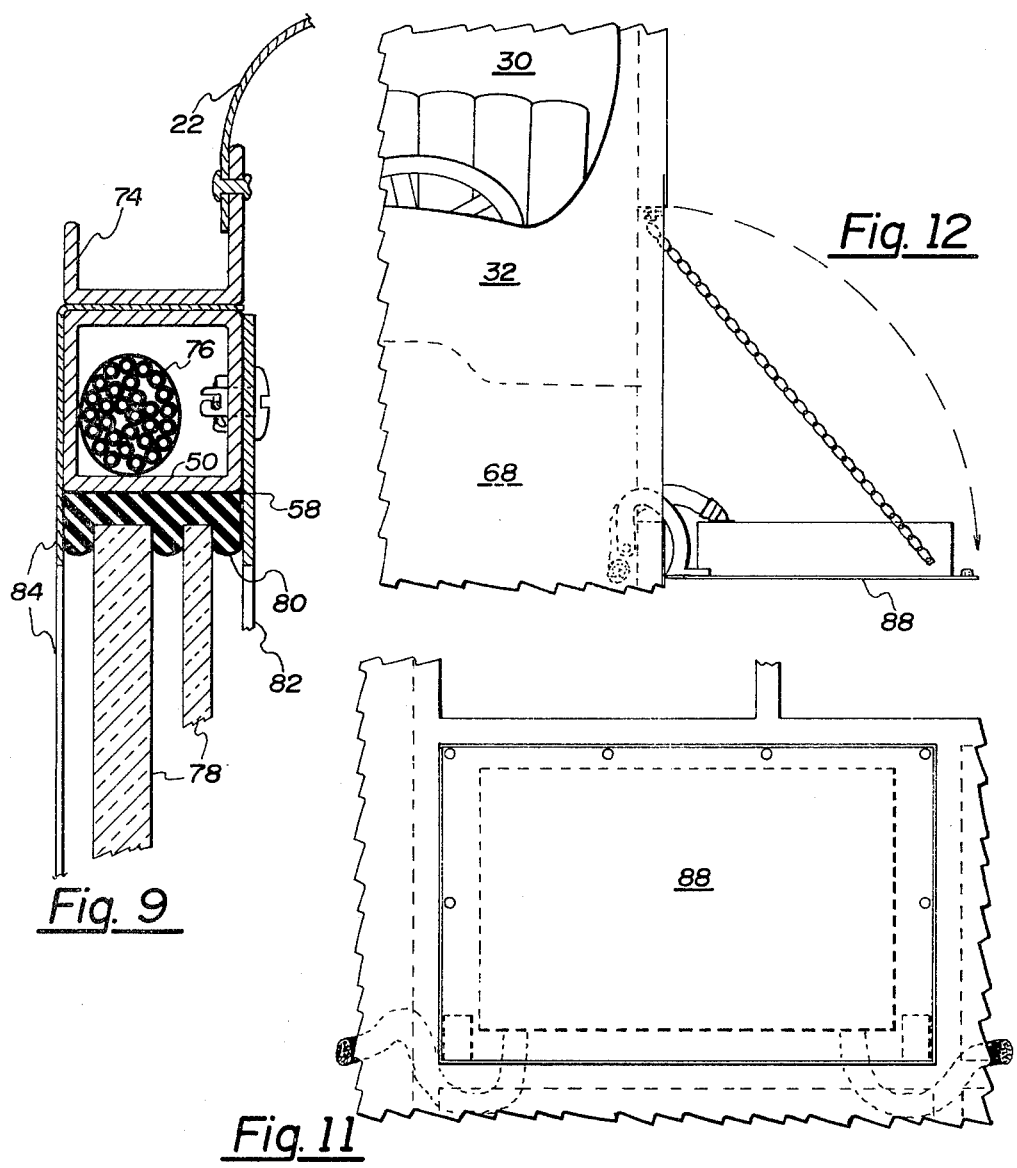

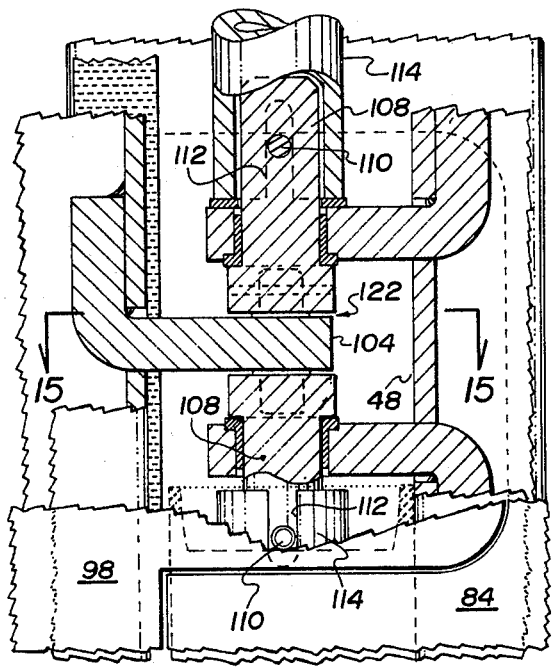
Fig. 19
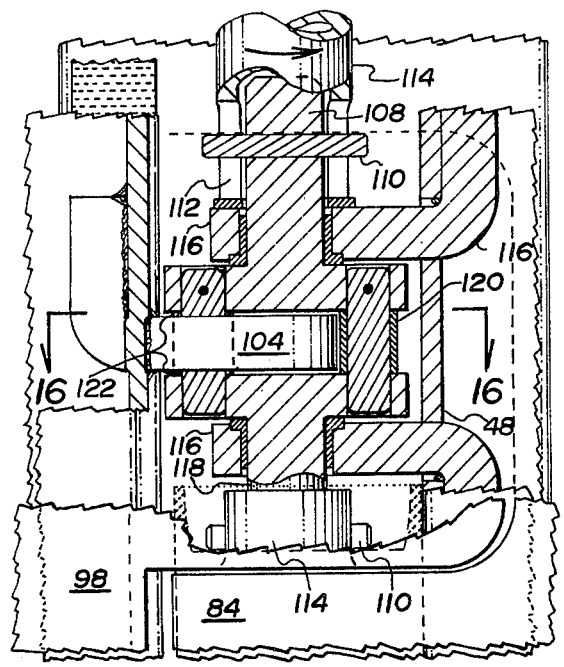
Fig. 20
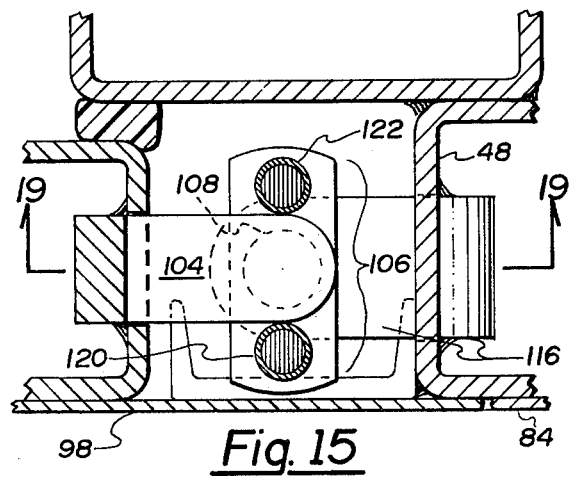
Fig. 15
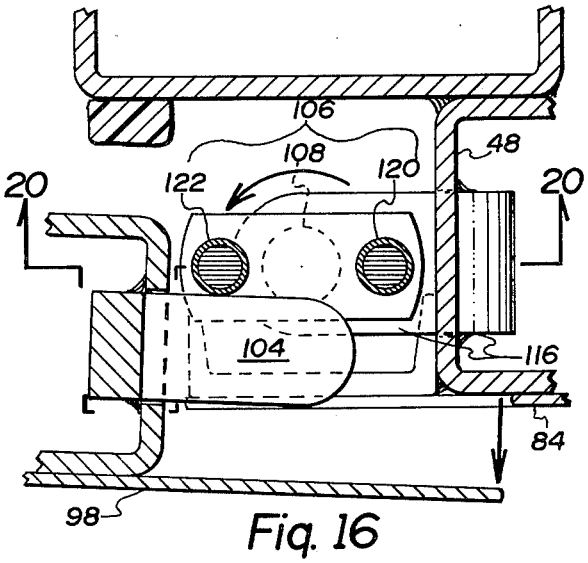
Fig. 16
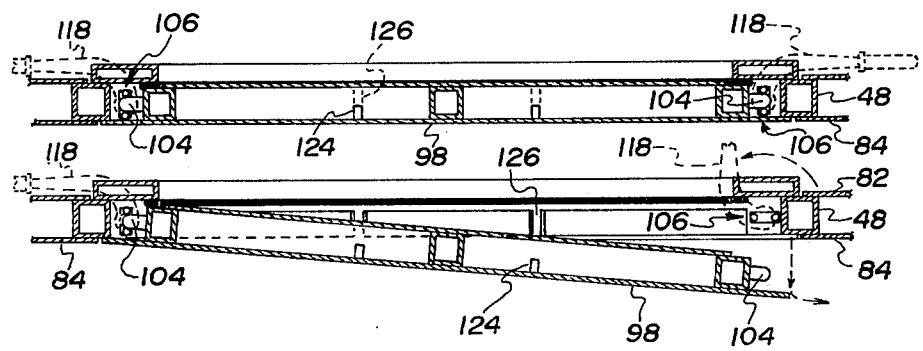
Fig. 17
Fig. 18

TRANSIT BUS MODERNIZATION METHOD

BACKGROUND OF THE INVENTION

City buses currently in use will ordinarily last at least fifteen years in service subsequent to which they are replaced by new buses, as much because federal funding is available to help with replacement after fifteen years as because the buses are actually worn out. The cost of a new 40' transit bus is quite substantial, being well over $100,000. It has been determined by applicant that these old buses may be completely rebuilt mechanically, including rebuilt engines, drive trains, transmissions and so forth so that for a fraction of a cost of a new bus the older buses can be made mechanically equivalent. However, even though mechanically the bus may be in new condition and the interior may be remodeled to accord with the most up-to-date design standards, the external shell of the bus has remained an obstacle to the widespread adoption of the rebuilt buses. Probably few civic leaders would want less than the best for their communities, and thus opt for the greatly more expensive new buses as these buses have a slick, modern look and tend to enhance the aesthetic aspects of the community.

One reason the reconstruction of the exterior of a bus has not been attempted in the past is because the buses currently in use, at least those made a few years ago, are typically of monocoque, airplane type construction wherein rather than acquiring strength from a rigid framework, a thick, formed outer sheathing mounted to a few beams provides the body strength of the bus. This sheathing is riveted to the beams and ordinarily requires contour forming of the metal sheathing, at least adjacent the edges, because of the thickness required to provide adequate support.

Therefore, to date municipal acquisition of rebuilt and refurbished buses has not kept up with the purchase of new buses, and many older buses are scrapped which could much more economically and efficiently be recycled and made good for another fifteen years.

SUMMARY OF THE INVENTION

According to the present method, older buses are refurbished mechanically and on the interior, subsequent to which the exterior is completely redone to closely resemble the modern styling and functionally advantageous appearance of the new, much more expensive buses.

This is achieved basically by converting the bus construction from one of monocoque construction to a frame and skin construction which involves the steps of first stripping off the old monocoque sheathing, together with the frame windows and the emergency door which is on the driver's side. After the sheathing and windows, etc., has been removed, there remains the roof of the bus and a few transverse sheathing support beams to which the exterior sheathing was riveted.

Once this sheathing is removed, new frameworks are preferably jig-formed and subsequently welded onto the old sheathing support beams to define generally planar surfaces for the attachment of a metallic skin. This skin is stretched over the framework and then spot-welded into place. The skin along the sides of the bus interfaces with the roof sheathing, which is carried over from the old sheathing, by means of a rain gutter integral with the new framework along the sides, into which the edges of the old sheathing of the roof lap.

The framework which is attached to the old sheathing support beams defines window openings into which pre-framed windows consisting of glass having elastomeric border are pressed and retained in place by this subsequently applied skin. An emergency door frame to accommodate a modernized emergency door is similarly defined in the new framework.

The sheathing on the front of the bus beneath the existing window and windshield cowlings is stripped and a framework placed thereover which is subsequently covered with formed fiberglass sheathing defining a continuous exterior with the side skin. The rear structure is replaced with a hinged fiberglass engine compartment lid, and the side sheathing toward the front of the driver's side incorporates a hatch or trap door to permit access to the bus engine when the refurbishing is complete.

BRIEF DESCRIPTION OF THE DRAWINGS

FIG. 9 is a section taken along the roof line and the rain gutter showing the upper portion of the window frame;

FIG. 10 is a front elevation view of a portion of the framework having the glass in place with the outer skin shown in dotted lines;

FIG. 11 is an elevational view of the side of the bus adjacent the driver showing the electrical control panel access door;

FIG. 12 is a front elevation of the bus showing the access door of FIG. 11;

FIG. 15 is a section taken along line 15—15 of FIG. 19 showing the safety door latch; and FIG. 16 is a view similar to FIG. 15 but with the latch open;

FIG. 17 is a horizontal section through the emergency door in its closed position;

FIG. 18 is a horizontal section similar to FIG. 17 but with the emergency door open;

FIG. 19 is a vertical section taken along line 19—19 of FIG. 15; and

FIG. 20 is a vertical section of the hinge taken along line 20.

DETAILED DESCRIPTION OF THE PREFERRED EMBODIMENT

Figure 1:
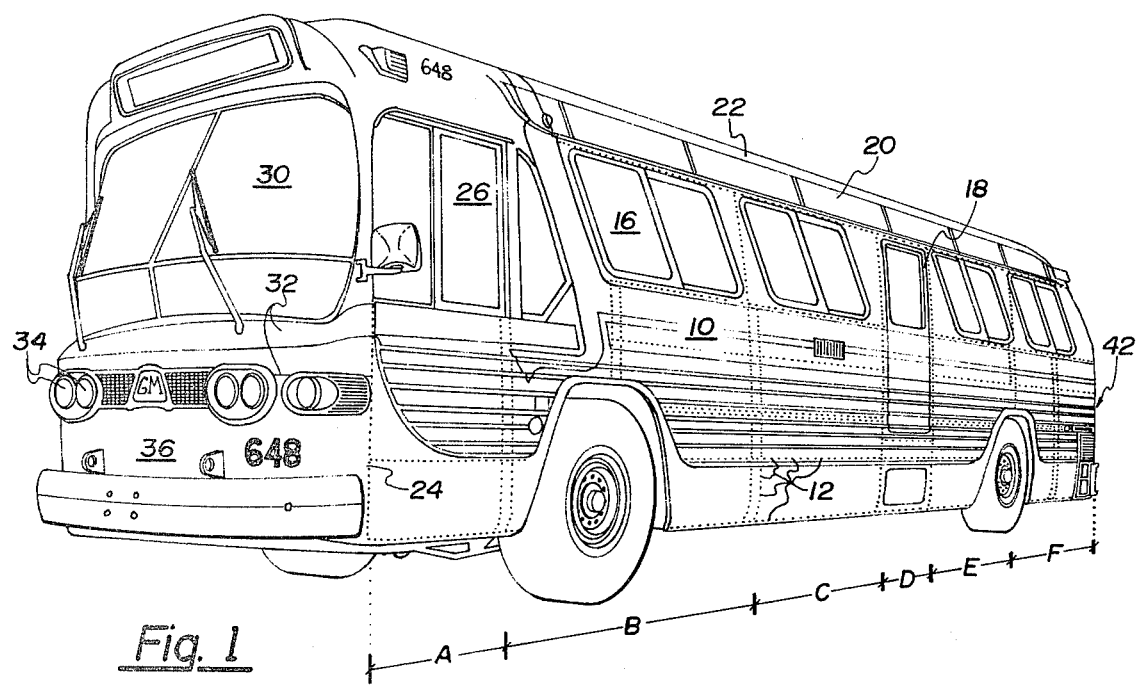
FIG. 1 is a perspective view of a bus prior to renovation.

The old-style bus is shown in FIG. 1. Buses of this style have slightly curved exterior side sheathing shown at 10 which accounts for a substantial portion of the body strength of the vehicle. The side sheathing is fastened by means of rivets 12, visible in FIG. 1, through a series of sheathing support beams 14 shown in dotted line in FIG. 3. It is the purpose of this invention to convert the bus shown in FIG. 1 into the more modern looking stylized bus illustrated in FIG. 2.

Turning again to the bus in FIG. 1, mounted in the side sheathing are slant-edged windows 15 which define a row along each side interrupted on the driver's side by the emergency exit 18 and on the non-driver's side by the passenger exits, which are not replaced and are not shown in the Figure. Above the window 16 is a typical row of smaller windows 20, and above these windows is the roof sheathing 22 which remains with the bus throughout the conversion process. The edges of this roof sheathing are detached from their rivet attachments to the bus beams and reattached as described below.

To prepare the bus for its new look the side sheathing 10 is removed from the underlying beams 14, most conveniently by drilling out rivets 12. With the side sheathing, the frames for the windows 16 and 20, as well as the emergency door 18, are also removed so that nothing remains along the side of the bus but the bare sheathing support beams which are shown in dashed line in FIG. 3. In addition, the removed sheathing extends forward of the front tire all the way to the forward rivet line 24 shown in FIG. 1 so that the window on the driver's side at 26 is also removed.

Again referring to FIG. 1, the front of the bus comprises a front windshield 30 with a surrounding cowling 32 that extends to the upper edges of the front headlights 34. In order to modernize the front end of the bus, the front sheathing 36 is removed leaving the forward sheathing support beam 38, the two longitudinal bumper supports 40 seen in FIG. 6, and the headlights themselves which are temporarily disconnected but will later be mounted at a lower position on the bus body.

Figure 8:
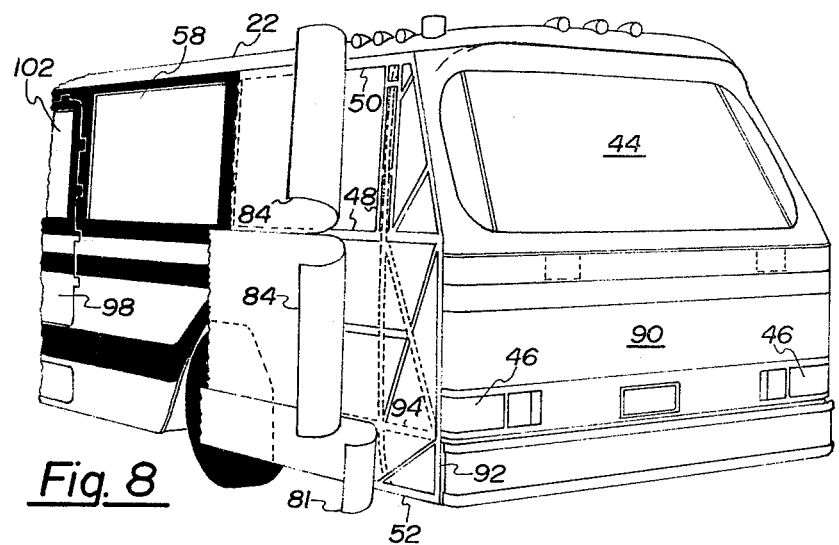
FIG. 8 is a perspective view of the rear of the bus showing the skin peeled back just prior to completion.
Figure 14:
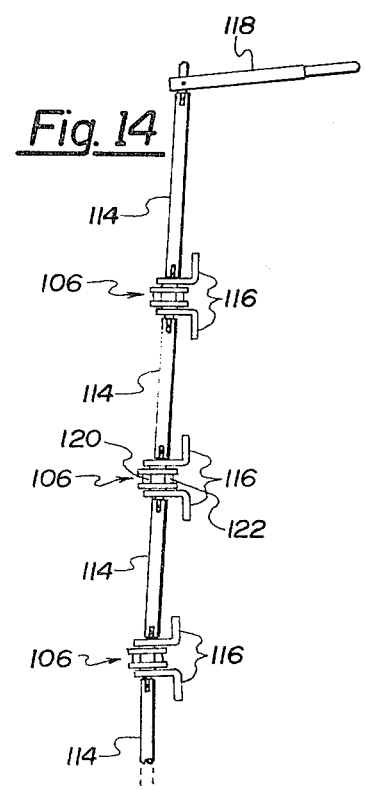
FIG. 14 is a perspective of the safety door release bar in isolation.
Figure 13:
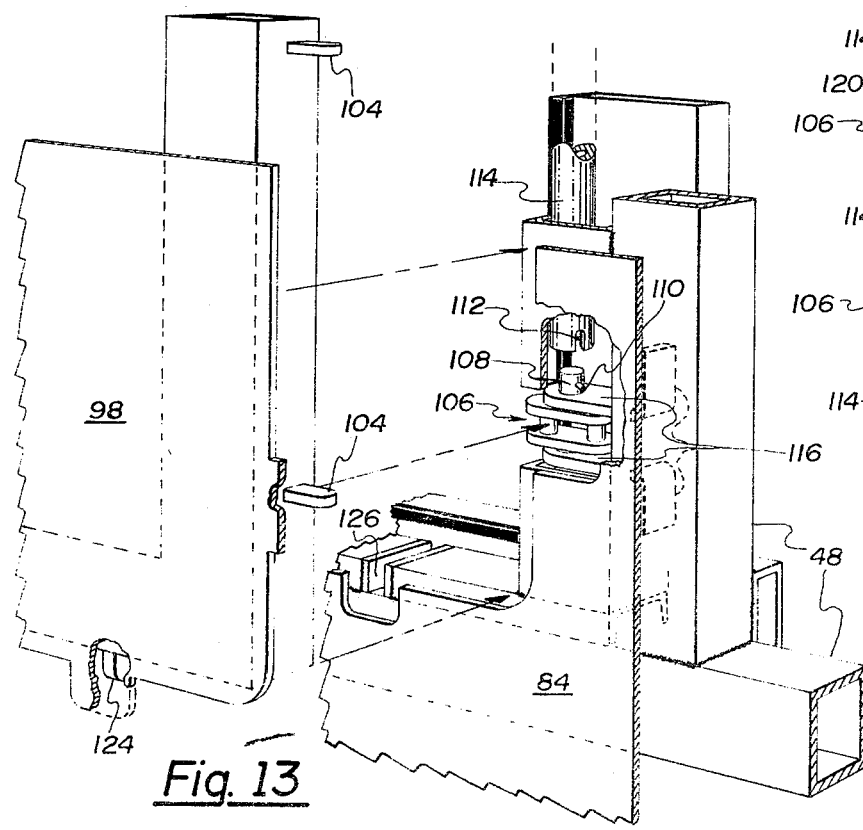
FIG. 13 is a perspective view showing the construction of the safety door attachment.

The rear of the old bus is treated substantially in the same manner as is the front with the rear sheathing 42, best seen in FIG. 8, removed from the upper edge of the bumper to beneath the cowling structure of the rear window 44. Again the rear tail lights 46 are temporarily removed so that none of the existing surface structure between the bumper and the bottom of the rear window cowling remains.

The right side of the bus which is not shown is treated in substantially the same way as the left, except that the two passenger doorways and their associated structure remain in place except insofar as wheelchair lift requirements necessitate modification and other functional design changes concommitant thereto. Otherwise, the sheathing is removed from the lower edge of the roof sheathing 22 down to the bottom of the bus.

Figure 2:
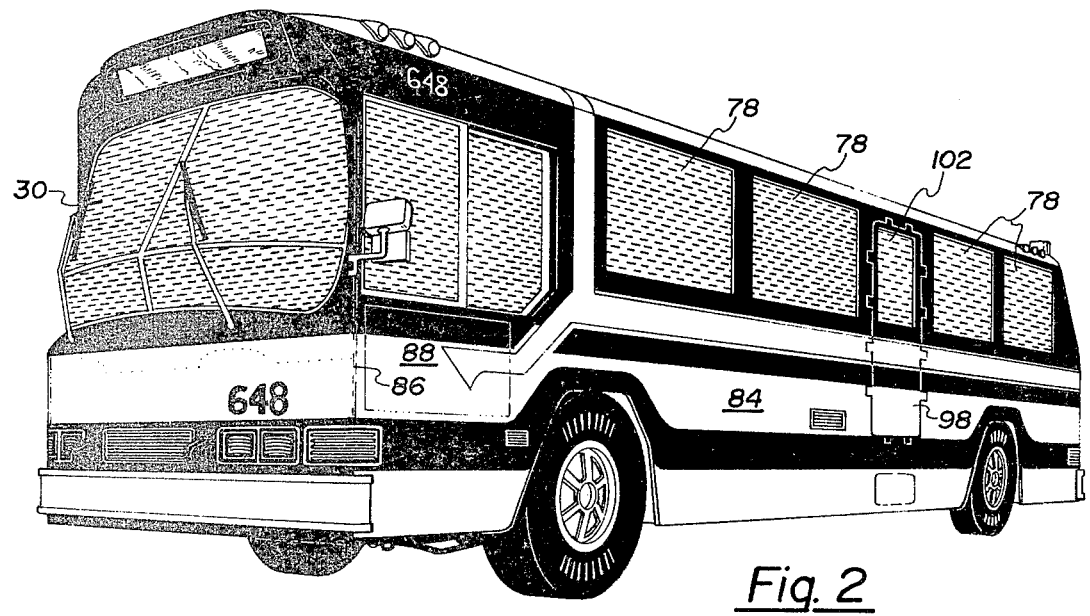
FIG. 2 is a perspective view of the bus of FIG. 1 subsequent to renovation.
Figure 3:
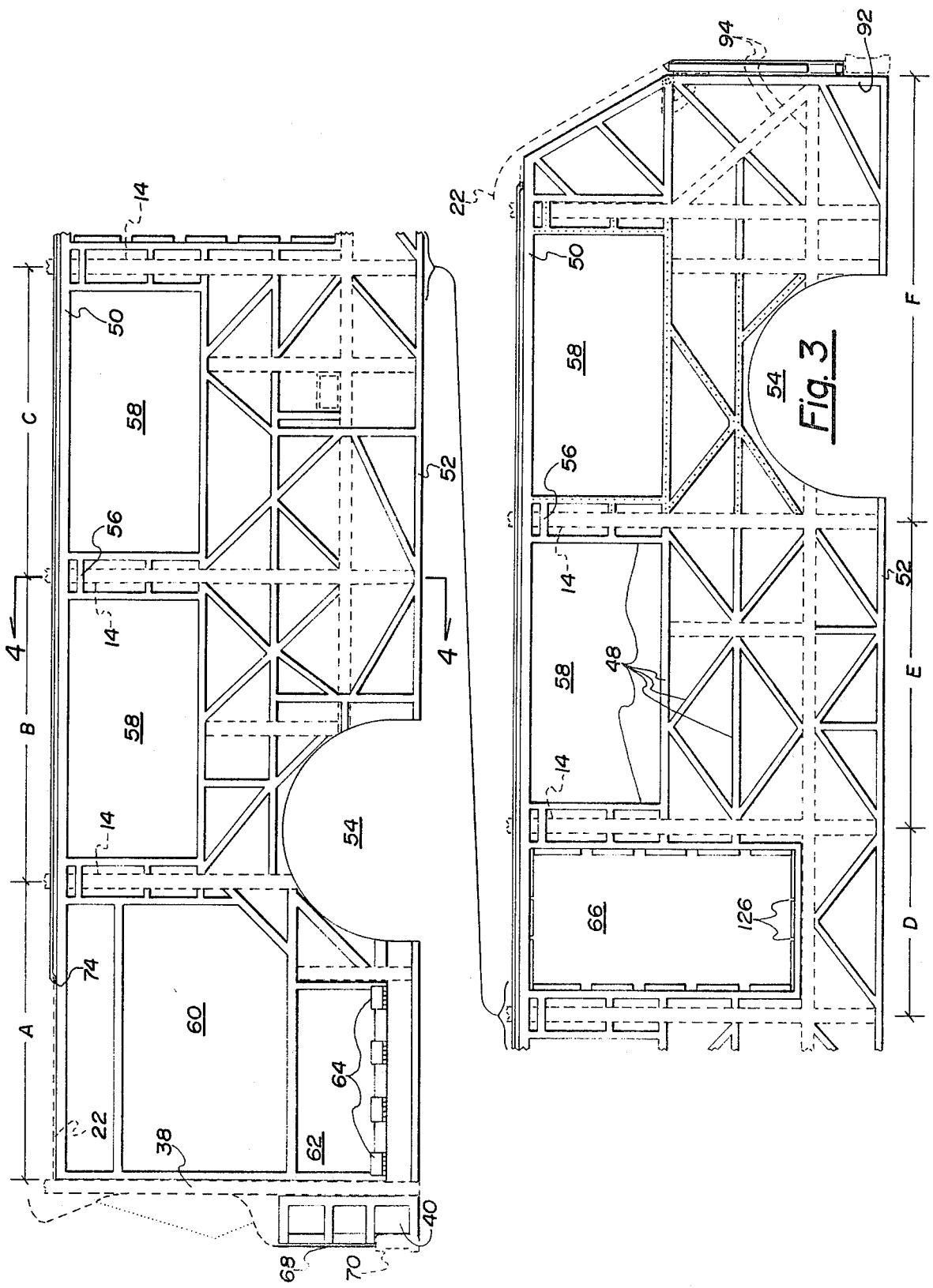
FIG. 3 is a diagrammatic view of the left side framework showing in dotted line the existing sheathing support beams.
Figure 4:
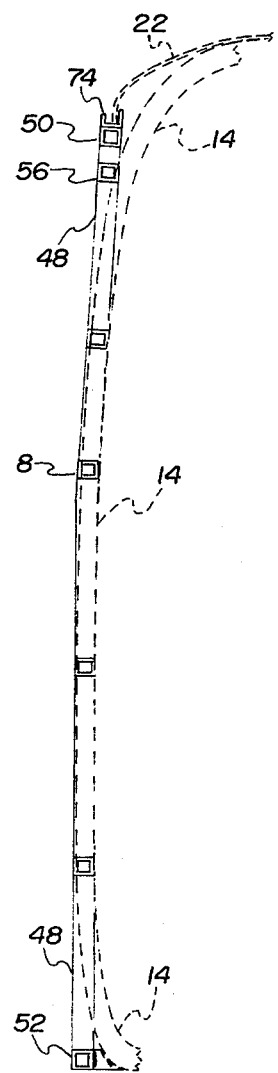
FIG. 4 is a section taken along line 4—4 of FIG. 3.

Once all the sheathing has been removed as described above, it is necessary to fabricate a framework which defines a generally planar exterior as is best seen in cross section in FIG. 4 so that the bus side will appear substantially vertical as shown in FIG. 2. This is accomplished by means of a plurality of horizontal, vertical and diagonal braces shown for the side members at 48 which are welded between an upper rectangular tubular beam 50 and a parallel bottom beam 52 which is interrupted to accommodate wheel wells 54. This framework, which is shown in solid line in FIG. 3, can be made in a jig as one piece to cover the entire sidewall, or made in several more easily manageable segments and welded together in position.

In any event the framework is characterized by its adaption to the existing beams 14, shown in dashed line in FIG. 3 and more easily visualized from FIG. 4. It should be noted that some of the horizontal frame members or braces 48 abut against and are welded to the sides of the existing beams 14, whereas those short horizontal members such as indicated at 56 are continuous and pass outside of the sheathing support beam 14 due to the latter's curvature.

The upper portions of the framework define rectangular window spaces 58 and a forward space 60 defines the driver's window space.

Other features to be noted in the framework shown in FIG. 3 are the electrical control board and panel access opening 62 having integrally mounted outwardly directed hinges 64 and emergency exit space 66, described in more detail hereinafter.

Figure 6:
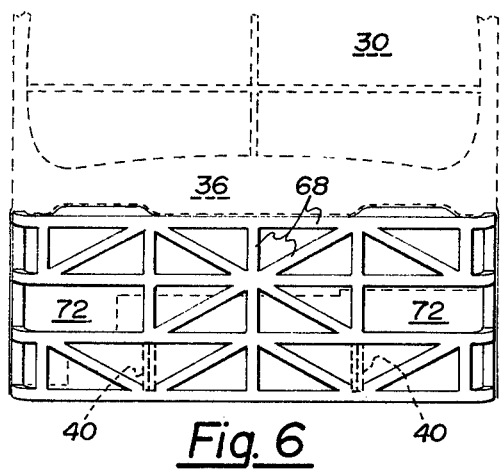
FIG. 6 is a front elevation view of the lower front of the bus showing the framework in place.
Figure 7:
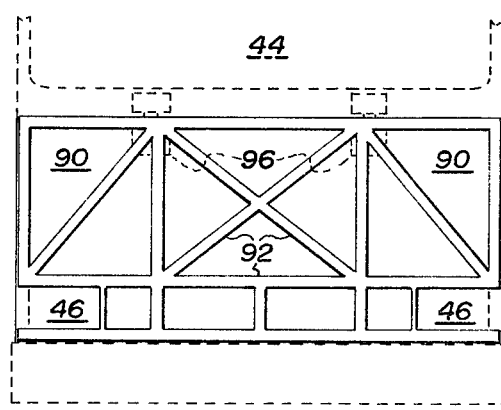
FIG. 7 is a view similar to FIG. 6 but of the rear of the bus.

Turning now to the front of the bus which can be seen in FIGS. 3, 6, and FIGS. 1 and 2, (before and after), as mentioned above all structure forward of the foremost sheathing support beam 38 has been removed below the windshield cowling and in its place is mounted a jigged front framework 68. This framework has slots to accommodate bumper supports 40 (the bumper 70 is removed prior to the installation of the front framework). This framework is welded into place against vertical beams 38 and as can be seen in FIG. 6 spaces 72 will be utilized to mount the headlights in the positions shown in FIG. 2.

Referring to FIG. 9, welded along the top of the tubular beam 50 is an extruded drip channel 74 having the lower edge of the existing roof sheathing 22 riveted or otherwise attached to the inner flange, thus smoothly making the transition from the new sidewalls to the old roof sheathing. This requires a slight reorientation of the roof sheathing as shown in FIG. 4, but otherwise causes no problems.

Referring again to FIG. 9, other features to be noted are the harness cable 76 which runs through the tube rather than along the inside and the upper outer roof sheathing, as was the case in the prior buses, and thus is less subject to shorts. Viewing FIG. 9 in conjunction with FIG. 10, it can be seen that a double layer of glass 78 is retained inside an elastomeric rim or frame 80 which is press-fitted into the window opening 58. A somewhat similar technique is used to install the openable window of the driver into the space 60, and in both cases, the interior sheathing 82 of the bus defines the inner stop for the frame (the interior sheathing is not otherwise shown as it pertains to another aspect of the bus renovation). The outer skin 84 both retains the window in its border within the appropriate opening and visually defines the window aperture as shown in FIG. 10 in dashed line, although a significant number of windows will be provided as emergency pop-out windows, either by permitting the glass to pop out of the rubber border, or otherwise.

The sheathing or skin 84 is applied by stretching it tautly across the framework of the sides and front of the bus and spot-welding it to both the beams 14 and the framework members 48. FIG. 8 shows the skin being applied to the last exposed portion of the rear area of the side of the bus. Obviously, the skin is cut to leave openings for the wheel wells, the windows and the emergency door along the side, and the headlights at the front of the bus. Where two sections of the skin meet as along the front edge seam 86, the edges are lapped and spot-welded together to an underlying beam or frame member. Opening 62 corresponds to an opening in the skin and is filled with a hinged access flap 88.

With the side skins in place (or even before they are in place), the rear tailgate 90 is installed. This tailgate may be performed such as with a metallic framework having a fiberglass skin stretched thereover. The tailgate mates against built-up rear frame members 92 supported on the ends of diagonal sheathing support beams 94, and U-shaped hinges 96 mount the tailgate to the frame members.

Turning now to the emergency door 98 and its mounting in the frame of the bus, the new emergency door is provided with a release or knock-out handle at both its forward and rear edges for an added degree of safety. The door that is used is detailed in FIGS. 13 through 20 and includes a door panel 100 having an upper window 102. The door panel has four projecting locking tongues 104 extending from both the forward and the rearward edge. These tongues are engaged by double-acting lock rollers 106. These lock rollers each have a vertically extended pair of trunnions 108 having cross pins 110 engaged in slots 112 of the segmented torque tube 114. The torque tube is journaled in brackets 116 so that upon swinging the emergency release handle 118, all of the lock roller assemblies move in unison from the position shown in FIG. 15, in which outer rollers 120 maintain the locking tongues in position, to the position shown in FIGS. 16 and 20 where the outer roller 120 has freed the tongue and the inner roller 122 actually forces the tongue out of position so that the door falls freely as shown in FIG. 18.

It can be clearly seen from FIGS. 17 and 18 that actuation of either one of the two emergency release handles 118 on opposite sides of the door will have exactly the same effect and cause the emergency door to be released as shown. Front to rear stability of the safety door is achieved by locater pins 124 which seat in slots 126 defined in the emergency door jam.

Figure 5:
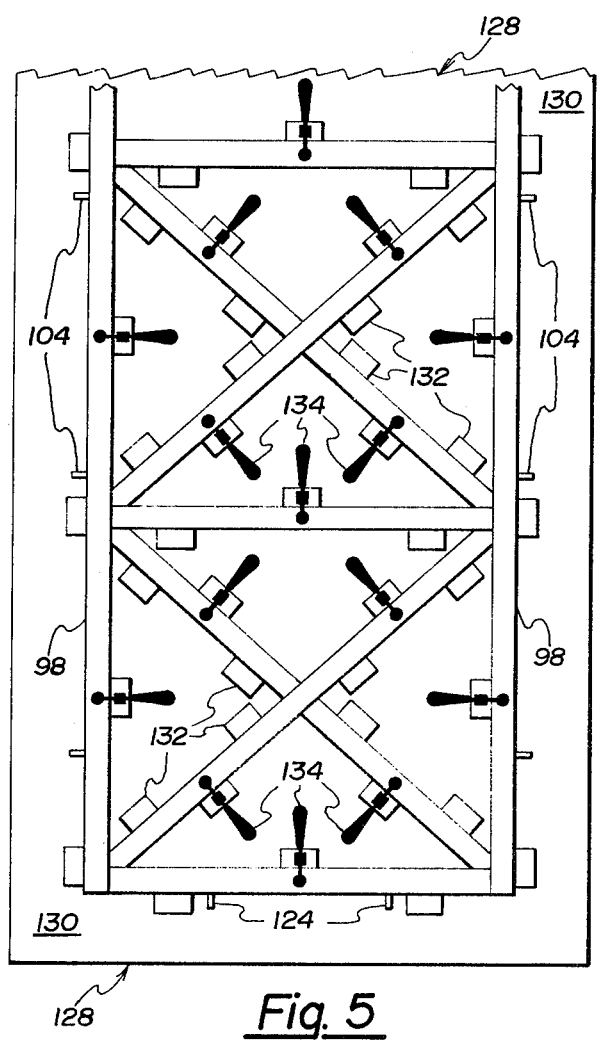
FIG. 5 is a plan form view of a framework portion used in the emergency door laid out in a jig.

A typical jig 128 used to fabricate the door is shown in FIG. 5. This type of jig could be used to construct most of the side framework structure and consists of a planar backing 130 having strategically positioned guides 132 and quick-release clamps 134 to hold the frame members in place while they are welded together (only a portion of the jig is shown in FIG. 5; the upper end extends to jig the emergency door window frame into place).

It is acknowledged that in the name of brevity a number of fine craftsmanship details, particularly relating to the fairing of one edge into the next and the finishing off of corners, etc., have been left for the work of the craftsman. Many of the drawings together with the accompanying explanation have been left diagrammatic to simplify the understanding of the process described herein without including any of the thousands of structural details which are inherent in the composition of a bus, but which are not really relevant to this invention. Thus, where some features have been shown in minute engineering detail, other broad areas have been left diagrammatic, as it is the general process as set forth in the claims, and not the details of craftsmanship for which applicant seeks a patent.

However, by following the outline set forth above and finishing off the result with the application of the skill of appropriate craftsmen, a bus such as that shown at FIG. 2 can be produced from a bus such as that shown in FIG. 1 so as to be indistinguishable from a brand new bus fresh off of the assembly line, at least insofar as external appearance is concerned. In addition, the advantages of sturdy frame construction and the provision of an improved emergency door, window structure and access to vital portions to the working mechanisms of the bus are provided.

What I claim is:

1. A method of modernizing the exterior of a bus and converting same from monocoque to frame construction, said method comprising:
   (a) stripping away the existing sheathing along the sides of said bus beneath the roof line;
   (b) removing the existing window frames and the emergency door from the sides of said bus;
   (c) fabricating a rigid generally plane-defining side framework between said side sheathing support beams on each side of said bus to support an exterior skin;
   (d) installing new framed windows and an emergency door in said framework;
   (e) stretching an exterior skin over said framework; and
   (f) attaching said skin to said framework.

2. A method according to claim 1 wherein said framework defines a continuous border for said framed windows, said framed windows comprise glass sheets with elastomeric border frames, and step (d) comprises pressing said glass sheets with elastomeric frames into said contiguous borders.

3. A method according to claim 1 and including the further step of stripping the existing sheathing from the front of said bus beneath the windshield cowling, mounting a skin support framework to the frame of said bus, and mounting a pre-formed skin to the framework on the front of the bus.

4. A method according to claim 3 wherein said skin is metallic, step (f) comprises spot-welding said skin to said framework, and said pre-formed skin for the front of said bus is fiberglass.

5. A method according to claim 1 and including the further step of removing the existing sheathing from beneath the rear window cowling, and mounting a pre-formed hinged engine compartment lid thereto.

6. A method according to claim 1 wherein step (a) leaves a substantially continuous edge of roof sheathing intact along each side of said bus, and further including the steps of fabricating a rain gutter integrally across the upper edge of said framework with the edge of said roof sheathing fastened internally of said rain gutter.

7. A method according to claim 1 wherein step (c) comprises the sub-steps of fabricating a plurality of steel frameworks on jigs and welding said frameworks into place on said sheathing support beams.

* * * * *